United States Patent
Jaramillo et al.

(10) Patent No.: US 8,276,089 B1
(45) Date of Patent: Sep. 25, 2012

(54) SYSTEM AND METHOD FOR PRODUCING, DISPLAYING AND PRINTING DOCUMENTS

(75) Inventors: Narciso Jaramillo, Oakland, CA (US); Steven Johnson, Oakland, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1889 days.

(21) Appl. No.: 10/886,263

(22) Filed: Jul. 6, 2004

Related U.S. Application Data (60) Provisional application No. 60/485,829, filed on Jul. 8, 2003.

(51) Int. Cl.
*G06F 3/048* (2006.01)

(52) U.S. Cl. ......... 715/769; 715/760; 715/763; 715/764

(58) Field of Classification Search ........... 715/764, 715/513, 769, 760, 763, 854, 201, 202, 203, 715/204, 209, 277
See application file for complete search history.

(56) References Cited

U.S. PATENT DOCUMENTS

| | | | |
|---|---|---|---|
| 5,745,112 A * | 4/1998 | Hirose | ........................ 715/769 |
| 6,357,038 B1 | 3/2002 | Scouten | |
| 6,775,821 B2 | 8/2004 | Scouten | |
| 2002/0114009 A1* | 8/2002 | Stevens et al. | ............... 358/1.18 |
| 2003/0028849 A1* | 2/2003 | Bodlaender et al. | .......... 715/513 |
| 2004/0252326 A1* | 12/2004 | Bukowski et al. | .......... 358/1.15 |

OTHER PUBLICATIONS

Bruce Schneier, *Applied Cryptography Second Edition: Protocols, Algorithms, and Source Code in C*, New York, John Wiley & Sons, Inc., 1996.
Feng Yuan. *Windows Graphics Programming: Win32 GDI and DirectDraw*, New Jersey, Prentice Hall, 2001.
Microsoft Windows. [online] Windows driver development kit. microsoft.com/whdc/ddk/default.mspx (2007).
www.adobe.com/licensing/developer [in Specification, referenced as macromedia.com/software/flash/open/licensing/fileformat] (2007).
Apple device driver specifications http://developer.apple.com/macos/printing.html.

* cited by examiner

*Primary Examiner* — Weilun Lo
*Assistant Examiner* — Rashedul Hassan
(74) *Attorney, Agent, or Firm* — Fish & Richardson P.C.

(57) ABSTRACT

A system and method creates an output document file that describes the appearance of a source document from a print stream of commands received from an application, and allows the output document file to be printed or displayed via a lightweight application, such as a plug-in to a browser. User interface controls are merged into the document at the time of creation, allowing those controls to be customized to viewer's needs.

15 Claims, 5 Drawing Sheets

SYSTEM AND METHOD FOR PRODUCING, DISPLAYING AND PRINTING DOCUMENTS

RELATED APPLICATION

This application claims the benefit of U.S. Provisional Patent Application Ser. No. 60/485,829, entitled, "Method and Apparatus for Producing, Displaying and Printing Documents" filed on Jul. 8, 2003 by Narciso Jaramillo and Stephen Johnson and having the same assignee as the present invention and is hereby incorporated by reference in its entirety.

FIELD OF THE INVENTION

The present invention is related to document production, display and printing, and more specifically to the production, display and printing of documents on one computer system produced on another computer system.

BACKGROUND OF THE INVENTION

Documents can be produced on one computer system and displayed on another computer system. When a document is displayed on a computer system different from the computer system on which it was produced, or if the document is displayed on different computer systems, it may look differently to the user of each computer system. This can cause problems when users are discussing the document because each user will see the document a little differently from the others. Even if the document may not be discussed by different parties, the author may wish to ensure that the document looks the way the author intends it to look, no matter which type of computer is used to display it. For example, the look of a marketing document may be important to the author of that document, who would prefer to control its appearance precisely.

One solution to this problem has been to use a computer program designed to allow documents to retain the same look on different computer systems. The Acrobat program, such as Acrobat 6 commercially available from Adobe Systems Corporation of San Jose, Calif. is one such program. However, there are several problems with the Acrobat program. First, it requires the party wishing to view a document to obtain and then install application program software dedicated to that task, a time consuming approach. Once the software is installed, it must be run as a separate application program, which consumes additional time every time the user wishes to view the document.

Once the viewer runs the Acrobat program, an overwhelming user interface is shown to the user that, although allowing the user to perform a plethora of functions, can intimidate the user who may need to perform less than all of the functions available. This is particularly annoying in a document viewing program, because many users do not wish to use many functions at all: they just want to quickly view the document without having to learn a confusing user interface, such as that provided by the Adobe Acrobat software.

What is needed is a system and method that can allow a document to be viewed in a consistent format on different computer systems in a manner desired by the author of the document without requiring the party viewing the document to install software dedicated to viewing documents in a consistent format and without requiring the user to run an application program dedicated to viewing documents, and that has a user interface that can be customized by the author.

SUMMARY OF INVENTION

A system and method registers itself with an operating system as a logical printer and accepts a stream of commands that allow a printer to print a file. However, instead of printing the file, the system and method convert the stream of printer statements to a file of statements that describe the appearance of the file, and store buffers containing images received as part of the stream, and fonts referenced by it. The system and method then incorporates the fonts, images and statements along with a separate file containing user interface commands into an output document file. The output document file can then be read by a lightweight application, such as a plug-in to a browser. The file containing user interface commands can be modified before it is incorporated into the output document file so that it can contain a user interface of any desired complexity, without requiring all of the reviewers of the document contained in the output document file to view every possible user interface control, including those that have no relation to the document.

DETAILED DESCRIPTION OF A PREFERRED EMBODIMENT

Figure 1:
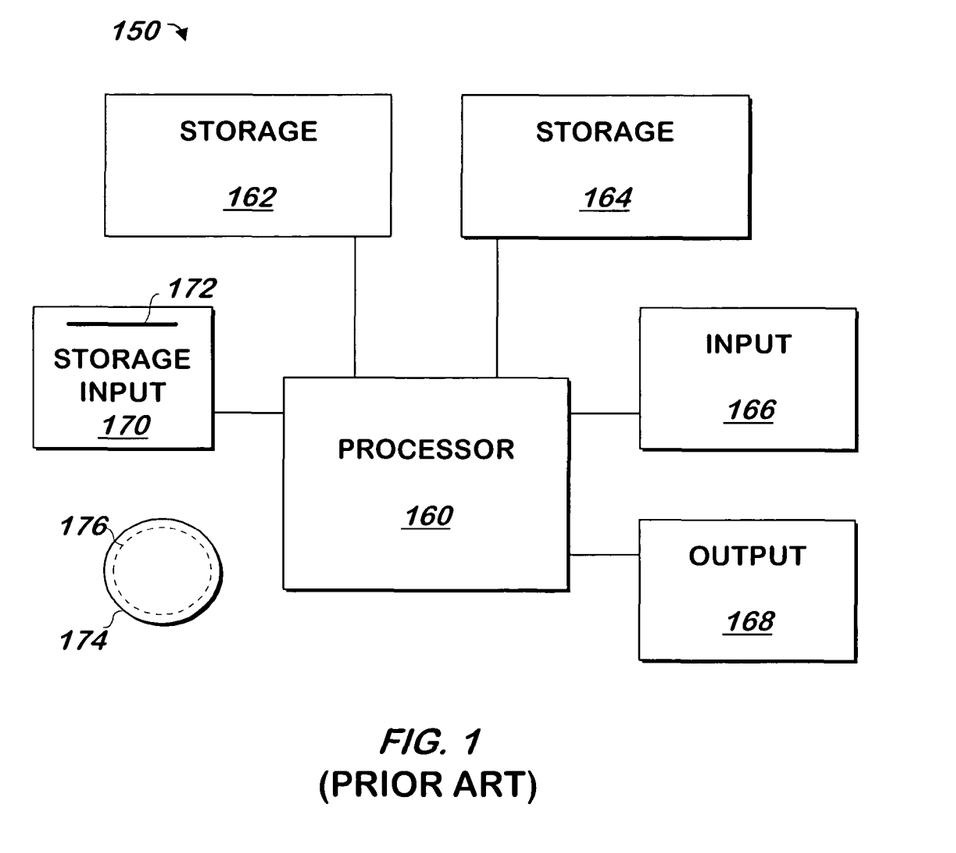
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS, OPENSTEP or OS X operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Figure 2:
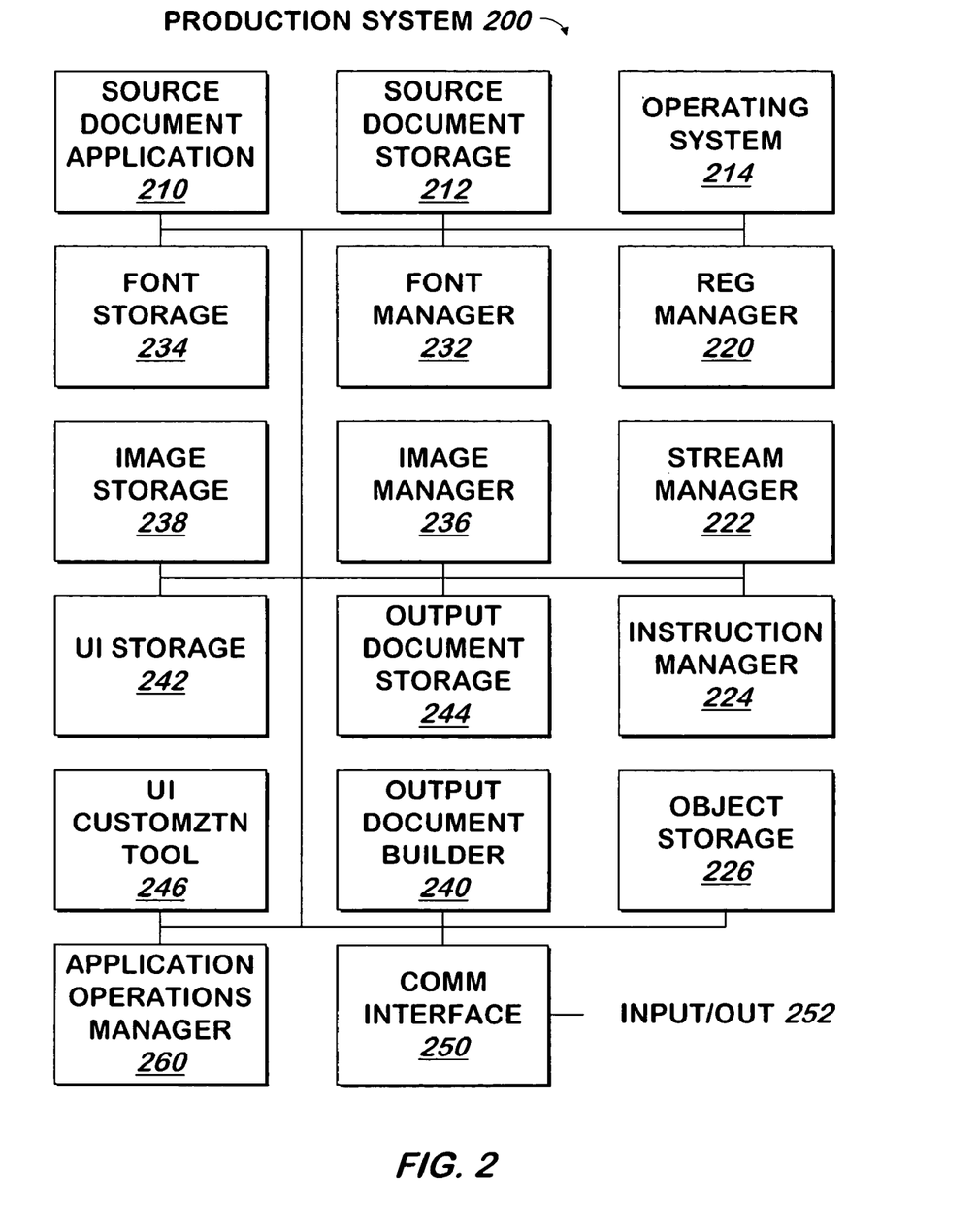
FIG. 2 is a block schematic diagram of a system for producing documents according to one embodiment of the present invention.

In one embodiment, all communication into or out of system 200 is made via input/output 208 of communication interface 210 which is coupled to a network such as the Internet or a local area network or both. Communication interface 210 is a conventional communication interface that supports TCP/IP or other conventional communication protocols.

Producing the Stream

Referring now to FIG. 2, a system 200 for producing documents is shown according to one embodiment of the present invention. A source document capable of being read by source document application 210 is stored in source document storage 212, which may be conventional memory or disk storage. Source document application 210 may be any conventional computer software application, such as the conventional WORD word processing application program commercially available from MICROSOFT Corporation of Redmond, Wash. Source document application 210 may be any application that can print via the printing system supported by operating system 214, which is the operating system under which source document application 210 runs.

In one embodiment, registration manager 220 registers stream manager 222 as a conventional printer driver to operating system 214 as a printer using conventional operating system techniques described in the Windows driver development kit available from Microsoft at microsoft.com/whdc/ddk/default.mspx and also described in Feng Yuan, *Windows Graphics Programming: Win32 GDI and DirectDraw* (2000, Prentice Hall PTR, ISBN 0130869856) which are hereby incorporated by reference in their entirety. When the user uses the source document application 210 to print the source document stored in source document storage 212, the user may select the printer registered by registration manager 220. Source document application 210 provides to stream manager 222 a stream of statements using a page description language that describes how each printed page of the document that the user has requested source document application 210 to print should look. In one embodiment, the stream of statements complies with the Microsoft device driver specifications described in the Windows Device Driver Development Kit available at microsoft.com/whdc/ddk/default.mspx. In one embodiment, the stream of statements complies with the Apple device driver specifications described at developer.apple.com/macos/printing.html, also incorporated herein by reference in its entirety.

Processing the Stream.

Stream manager 222 then receives from source document application 210 a stream of objects that describes how to reproduce each "printed" page of the source document file the user has requested. Each object may be made of one or more statements as described in more detail herein. The objects can include graphics objects, text, or image information, or other statements which collectively, are referred to herein as the "stream".

If the object in the stream received by stream manager 222 consists of text, the object will include the name of the font into which the text is to be rendered. Stream manager 222 provides the object to instruction manager 224.

Instruction manager 224 provides the name of the font from the object to font manager 232. Font manager 232 identifies if the font having the name it receives from instruction manager 224 is stored in font storage 234 using an index of fonts stored in font storage 234 that font manager 232 maintains in font storage 234. If the font is not stored in font storage 234, font manager 232 requests the font having that name from operating system 214. Operating system 214 may provide the font requested, or may substitute another font according to a registry entry. Font manager 232 receives the font from operating system 214 and stores the font in font storage 234 associated with the name used to request the font, which font manager 232 stores in the index of fonts it maintains. If the font is stored in font storage 234, font manager 232 does not request the font. Font manager 232 provides to instruction manager 224 the name of the font stored in the index or another identifier that can be used to reference the font.

Instruction manager 224 converts the text it receives from stream'manager 222 and the name or other reference of the font it receives from font manager 232 into an object having the format of objects stored in object storage 226 as described above. In one embodiment, this format is XML, although other formats can be used. Instruction manager 224 stores into object storage 226 an XML object containing one or more tags and values that contain the text, its location on the page defined by the stream and the reference to the font.

If the object received by instruction manager 222 is an image, the image may be received as a series of tiles, which may or may not overlap, the tiles collectively forming the image object. Stream manager 222 provides the object to instruction manager 224, which provides the object to image manager 236. Image manager 236 stores the image into a new image buffer in image storage 238. If the image is tiled, image manager 236 stores the tiles in the order in which they are received, so that more recently-received tiles will overlap tiles received previously, if the tiles overlap.

When the entire image object is received, image manager 236 hashes the image using a conventional hash algorithm, such as a CRC or other hash function, such as any of those described in Schneier, *Applied Cryptography* (1996, John Wiley and Sons, Inc, ISBN 0471128457) and stores the result of the hash with the image. Image manager 236 then compares the hash result of the image most recently received with the hash results of the other images stored in image storage 238. If the hash result of the image most recently received does not match any of the hash results of the images previously stored in image storage 238, image manager 236 marks the new image buffer as used and provides an identifier of the image buffer to instruction manager 224. If the hash result of the image most recently received does match any of the hash results of the images previously stored in image storage 238, image manager 236 marks the new image buffer as unused (so that it can be reused upon receipt of the next received image) and provides to instruction manager 224 an identifier of the other image buffer containing the previously received image having the hash result matching the hash result of the most recently received image.

Instruction manager 224 builds an object including location information from the object it received from stream manager 222 and the identifier of the image buffer it received from image manager 236 using the format of object storage 226 (e.g. XML) and stores the object into object storage 226.

If the object is a graphics object, or an object that is other than a text object or graphics object, stream manager 222 provides the object to instruction manager 224, which converts it into an object having the format of object storage 226 (e.g. one or more XML tags and values) and stores the converted object into object storage. If the object is a graphics object, the object received from stream manager 222 will be described via one or more graphics primitive commands, such as lineto and fill. In one embodiment, instruction manager 224 converts the graphics primitive commands for each graphics object into an object having the format used by object storage 226, such as one or more XML tags and values, and stores the object into object storage 226, which may be conventional memory or disk storage.

Although instruction manager 224 is described herein as placing XML instructions into object storage 226, objects may be stored in any format in object storage 226. For example, in one embodiment, instruction manager 224 stores into object storage 232 some or all of each statement received in the stream without converting the form of each such statement.

When the entire stream of objects has been received and processed as described above, stream manager 222 detects the end of the stream or identifies an end of stream marker and signals output document builder 240. The objects in object storage 226, together with the fonts in font storage 234 and the images in image storage 238 describe the appearance of the portion or all of the source document corresponding to the stream received by stream manager 222 as described above.

Building the Output Document.

Output document builder 240 converts the objects stored in object storage 226, the fonts stored in font storage 234, the images stored in image storage 238 and a user interface file containing a user interface stored in user interface storage 242 into an output document, and stores the output document into output document storage 244, as will now be described. The output document describes the appearance of the portion or all of the source document corresponding to the stream received by stream manager 222 as described above, and also describes the appearance and operation of a user interface that may be used to navigate, control the appearance of, and print, the portion or all of the source document.

In one embodiment, the output document is stored in a format readable by a plug-in, such as the conventional FLASH PLAYER, to a conventional web browser, such as those described above. The FLASH PLAYER product is commercially available from MACROMEDIA, Inc. of San Francisco, Calif., and is described in more detail below. In the case of FLASH, the format of such a file is referred to as a .swf file, which includes a set of movie clips, much like a movie can be made from individual clips corresponding to scenes from a conventional motion picture. However, it is not necessary for movie clips to be arranged sequentially, as more than one movie clip may be simultaneously played during a movie, just as a conventional motion picture allows multiple movie clips to be displayed simultaneously, such as split screen shots or composite shots.

In one embodiment, the user interface file that output document builder 240 retrieves from user interface storage 242 contains a movie clip in Macromedia .swf format that contains computer instructions describing the user interface that can be used to allow a party reading the document to navigate the document (for example, by moving forward or backward pages) and control its display (such as enlarging or shrinking the document) and perform any other user interface functions.

In one embodiment, output document builder 240 selects the user interface file in user interface storage 242 having a certain file name. In one embodiment, the certain file name used by output document builder 240 is modifiable by the user of system 200 via a file selection user interface provided by output document builder 240. This allows output document builder 240 to let the user select any one of a number of user interface files in user interface storage 242 to use as the user interface for the output document file.

In one embodiment, the file selection user interface described above is part of the file name user interface used to allow the user to specify the name and path of the output file as described in more detail below. At the time it displays the file name user interface, output document builder 240 either prompts the user for the name of the user interface file to use each time it builds an output file, or output document builder 240 provides a button the user can use to change the name of the user interface file from the default: if the button is not used, output document builder 240 uses the default name for the user interface file stored in user interface storage 242.

In one embodiment, a network repository accepts from various contributors a variety of user interface files such as FLASH movie clips in .swf format or other files containing user interface controls to use as described above. Users may download to user interface storage 242 any such user interface files from the repository using communication interface 250 and input/output 252 coupled to the repository via a network such as the Internet. Any such downloaded user interface files may be selected as described above. Alternatively, a user can modify the source code for any such user interface file (such source code also being stored on the repository or in user interface storage 242) or create his or her own user interface file from scratch as described in more detail below. Any of these methods allow a user to incorporate in the output document a user interface file that meets the needs of the output document. Such a user interface file may contain just the user interface controls the user feels the reviewers of the output document will need or use, but no others.

Output document builder 240 requests the filename and path to use for the output document from the user via a user interface it provides via operating system 214. Output document builder 240 retrieves the user interface file described above from user interface storage 242 and inserts it into the output file it builds in output document storage 244. Output document builder 240 adds to the output document in output document storage 244 font information from font storage 234.

Output document builder 240 reads the instructions from object storage 226 and converts them into the corresponding instructions according to the format of the output document. Thus, if the instructions are in XML format, and the output document is in the Flash .swf format, output document builder 240 converts the XML instructions into their corresponding FLASH .swf counterparts and stores them in the output document in output document storage 244. The .swf file format is available at macromedia.com/software/flash/open/licensing/fileformat. The converted instructions, along with the font information and images, together describe how each page of the document should appear, allowing reproduction of the document on any computer system exactly the way it is described in the stream received by production system 200.

If the converted instruction includes a reference to an image not already referenced on a prior page, output document builder 240 adds the image and optionally, other related information from image storage 238 to the output document on the movie clip corresponding to the page in which the image is first used. In one embodiment, output document builder 240 converts images into a conventional format, such as into the conventional JPEG format before storing them in the output document in output document storage 244. If one or more instructions involves cropping an image that is displayed on a particular page, output document builder 240 includes the appropriate instruction to crop the instance of the image displayed on that page.

As output document builder 240 builds the output document, it adds instructions to allow each page to be separately reachable and to be displayed at the same time as the user interface, or to appear as part of the user interface. For example, if the output document is in the FLASH .swf format, output document builder 240 adds code to allow each page of the file stored in object storage 226 to correspond to a separate movie clip, and each such movie clip to be a child movie clip of the movie clip, retrieved from user interface storage 242, that makes up the user interface. If controls appear on the movie clip containing the user interface that will alter the appearance of one or more pages of the output document displayed, in one embodiment, output document builder 240 optionally adds code to, deletes code from, or modifies code on, the movie clip containing the user interface, the movie clips containing the page, or both to allow the control to properly operate (for example, to ensure all names are unique if such a characteristic is necessary or desirable). If structures other than movie clips are used, output document builder 240 may make other similar changes.

Altering the User Interface

In one embodiment, a user or other party may modify the source code for a user interface file using a conventional editing tool, such as the FLASH authoring tool commercially available from MACROMEDIA, Inc., of San Francisco, Calif. The user may use the editing tool to customize the look of, and/or the functions provided by, the source code for the user interface file, such as the .fla file containing the source code for the movie clip that contains the user interface and then build a new user interface file from the source code, such as by using FLASH. Functions may be added or removed to suit the needs of the intended audience for the document or an entirely new user interface may be defined using the editing tool. This allows the author of the document or another party to provide a user interface that has just what the audience requires, but little or no additional, unneeded functionality. In embodiments in which the user interface is not a movie clip, still other editing tools can be used to modify the user interface or build a new one.

In one embodiment, it is possible for output document builder 240 to perform such modifications or create an entirely new user interface based on the objects in object storage 226. In embodiment, output document builder 240 modifies the user interface that it inserts as described above based on the instructions in object storage 226. For example, if there is only one page in the instructions in object storage 226, output document builder 240 removes the user interface control from the user interface file that allows the user to move from page to page. Alternatively, if there are multiple pages in the instructions, output document builder 240 adds such a control to the user interface file if it does not exist.

The effect is that different documents produced by the same author or different authors can each have their own user interfaces. Because the user interface can be program-controlled, even the same document can have a different user interface for each user or type of user who uses the document, with the user interface either detecting, or prompting the user to provide, his or her identity or type. A set of instructions in the user interface file that gets inserted into the output document then modifies the display and/or operation of user interface controls based on the identity or type of user, or any other detected or received parameter or parameters.

Providing the File

Output document builder 240 optionally adds other instructions and codes and Components to complete the output document and stores it in output document storage 244. The document is now ready to be viewed on the same computer system or another computer system. Because the output document completely describes how the document should look on a page-by-page basis, the output document will appear the same no matter which computer system on which the output document is viewed or printed.

Figure 3:
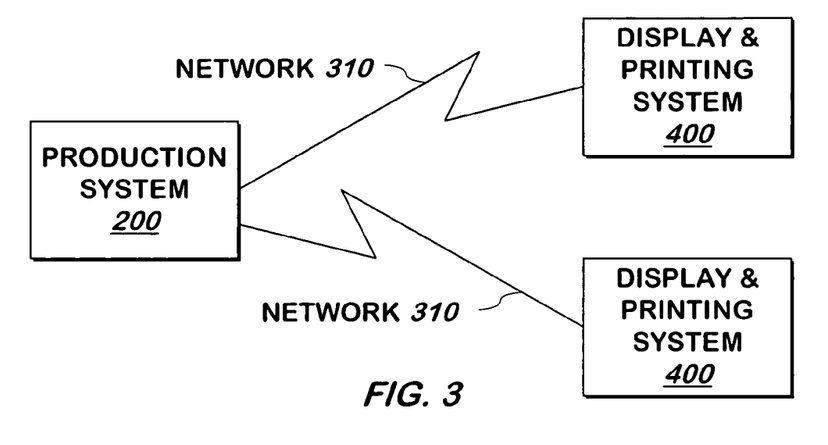
FIG. 3 is a block schematic diagram of a production system of FIG. 2 coupled to two display and printing systems of FIG. 4 via a network according to one embodiment of the present invention.

In one embodiment, the user may transfer the output document via communication interface 250, which can include a conventional communication interface, such as a conventional TCP/IP-compatible Ethernet Interface. Communication interface 250 is coupled to a conventional network, such as a wired or wireless Ethernet, which may be coupled to the Internet, or any other type of network. FIG. 3 illustrates a production system of FIG. 2 coupled to two display and printing systems described below with reference to FIG. 4 via a network according to one embodiment of the present invention. Referring momentarily to FIGS. 2 and 3, production system 200 may be coupled via network 310 to display and printing systems 400A and 400B, which are similar or identical to display and printing system 400 described below with reference to FIG. 4. Network 310 may be any wired or wireless network, such as an Ethernet network or the Internet. Although one production system 200 and two display and printing systems 400A, 400B are shown in the Figure, any number of these systems may be used. In one embodiment, communication interface 250 may include a disk interface and disk drive to allow the output document to be written to a conventional floppy disk or CD-ROM disc. This allows output documents to be transferred via disc.

Drag and Drop Production of Files.

Referring again to FIG. 2, in one embodiment, a user may produce an output document using system 200 by printing a file from any application to a logical printer employing the printer driver as described above. In one embodiment, a user may also or instead produce an output document from a file containing a source document using system 200 by dragging and dropping an icon of the file into a window provided by application operations manager 260, which may be a separate application program that can be run via a command to operating system 214.

During its operation, application operations manager 260 displays a window that can receive a file dragged and dropped into it by the user, and may optionally receive an identifier of a file using other means, such as a conventional file selection user interface control, menu command or other means. For drag and drop operation, the file may be dragged and dropped by dragging and dropping the file icon corresponding to the file from an application program (e.g. WINDOWS EXPLORER) that displays such icons, or using any other method of dragging and dropping a file that is supported by operating system. When a file is so dragged and dropped, operating system 214 indicates the drag and drop action and the name and path of the file so dragged and dropped to application operations manager 260.

When application operations manager 260 receives such an indication and name and path of the file, application operations manager 260 requests from operating system 214 via registry commands the application corresponding to the extension in the name of the file and requests from operating system 214 the "printto" shell command that allows printing to a specific printer using that application. Operations manager 260 then directs operating system 214, via a printto shell command, to run the application and print the file to the logical printer corresponding to system 200 as described above. The name of the logical printer may be supplied by the user or may be fixed, using the same name that was used to register it by registration manager 220. The application complies with the printto command and the output document is produced as described above.

Any application program from the various application programs installed on the user's computer system that allows printing via a printto shell command may be used to produce output documents in this drag and drop fashion. This allows a user to quickly produce output documents from various applications with an easy-to-use interface. Because application operations manager 260 does not otherwise control the production of an output document beyond the process, described above, it can be made to load and run quickly and without significant memory requirements, making it extremely lightweight. In one embodiment, application operations manager 260 does not require registration with operating system 214. An application that causes a document to be produced that can be reproduced on other computer systems with a consistent appearance by directing another application to produce the document and without otherwise producing that document is referred to herein as a "sineproduction application."

Displaying the Output Document.

Figure 4:
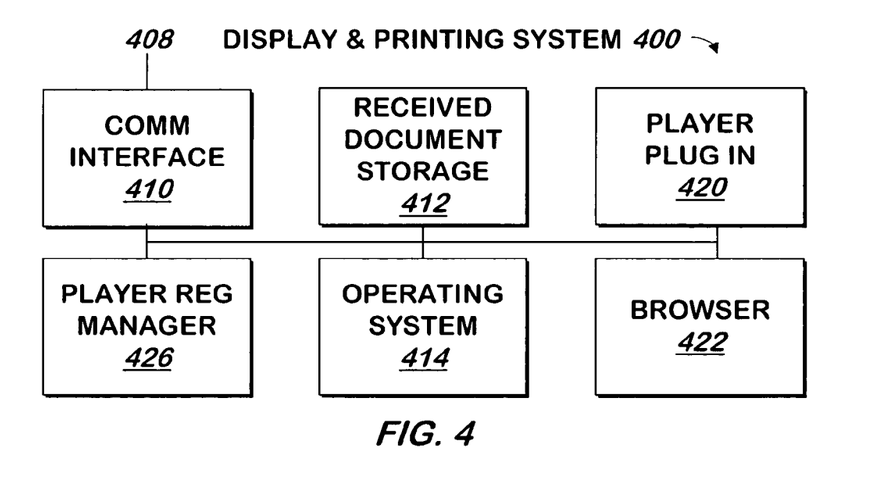
FIG. 4 is a block schematic diagram of a display and printing system according to one embodiment of the present invention.

Referring now to FIG. 4, a display and printing system 400 for displaying and printing output documents is shown according to one embodiment of the present invention. Communication interface 410 is a conventional communication interface similar or identical to communication interface 250 of FIG. 2. Communication interface 410 receives one or more output documents produced by production system 200 via input/output 408 and provides them to received document storage 412, which may be conventional memory or disk storage.

The user may install or have installed a plug-in 420 to a conventional browser 422, such as any of those described above, to view the output document. In one embodiment, the plug-in 420 includes the conventional FLASH Player commercially available from MACROMEDIA, Inc., of San Francisco, Calif. A plug-in to a browser allows the display and printing of output documents without requiring an application that is entirely dedicated to the display and/or printing of output documents. In the case of a plug-in to a browser, the browser, at least, has significant purposes unrelated to the display and/or printing of output documents. In the case of the FLASH Player, even the plug-in has significant purposes unrelated to the display and/or printing of output documents. Because the display and printing system 400 includes a plug-in to a browser, it is extremely lightweight because it runs faster than an application dedicated to the display and printing of output documents because it does not contain all of the user interface controls that can possibly be used with output documents nor load in all fonts that may be used with any output document. In addition, it does not require a dedicated application program to operate.

As used herein, a plug-in to a browser excludes an application or that portion of an application that can operate without the use of a browser. For example, an application program that uses the same window as a browser but can otherwise run without the browser is not a plug-in to a browser for purposes of this patent.

Although a plug-in to a browser is used as described herein, plug-in 420 and browser 422 may be replaced by an application program that operates similarly to the combination 420, 422 in another embodiment of the present invention.

When used to view an output document, plug-in 420 displays via browser 422 the user interface and each page of the output document. In one embodiment, each page of the output document is displayed within the user interface, inserted using the user interface file to appear as though it is on a physically separate piece of paper from the other pages, with the user interface controls allowing navigation from page to page via scrolling one page off the screen as another scrolls on, and other user interface controls allowing shrink to fit functions to be performed, either fitting just the page width to the available space for page display, or fitting one whole page to the available height and width, so that the ratio of height to width is unchanged, but so that one page fits within the space available for page display, with the page displayed as large as possible. Other controls perform different functions.

In one embodiment, one or more of the controls is a control to print the output document. The user may print any or all of the pages of the output document using this control or a menu item that prints one or more pages of the output document. Player plug-in 420 causes operating system 414 to print the output document to any printer that has been registered to operating system 414.

In one embodiment, player registration manager 426 registers with operating system 414 certain one or more file extensions that are used by production system 200 to create the output documents. Player registration manager 426 registers the extensions so that when a user of display and printing system 400 indicates to operating system 414 to run the application associated with the file, either via an application such as Windows Explorer, or via a third party application program, such as an e-mail viewer, operating system 414 will run browser 422 (unless it is already running) and/or instruct browser 422 to open the file containing the output document. Player registration manager 426 also registers player plug-in 420 with browser 422 to run plug-in 420 for files of that type. This, or other techniques which may be used, ensures that, when browser 422 opens the file as instructed by operating system, it will run plug-in 420 to process the file.

Methods.

Figure 5:
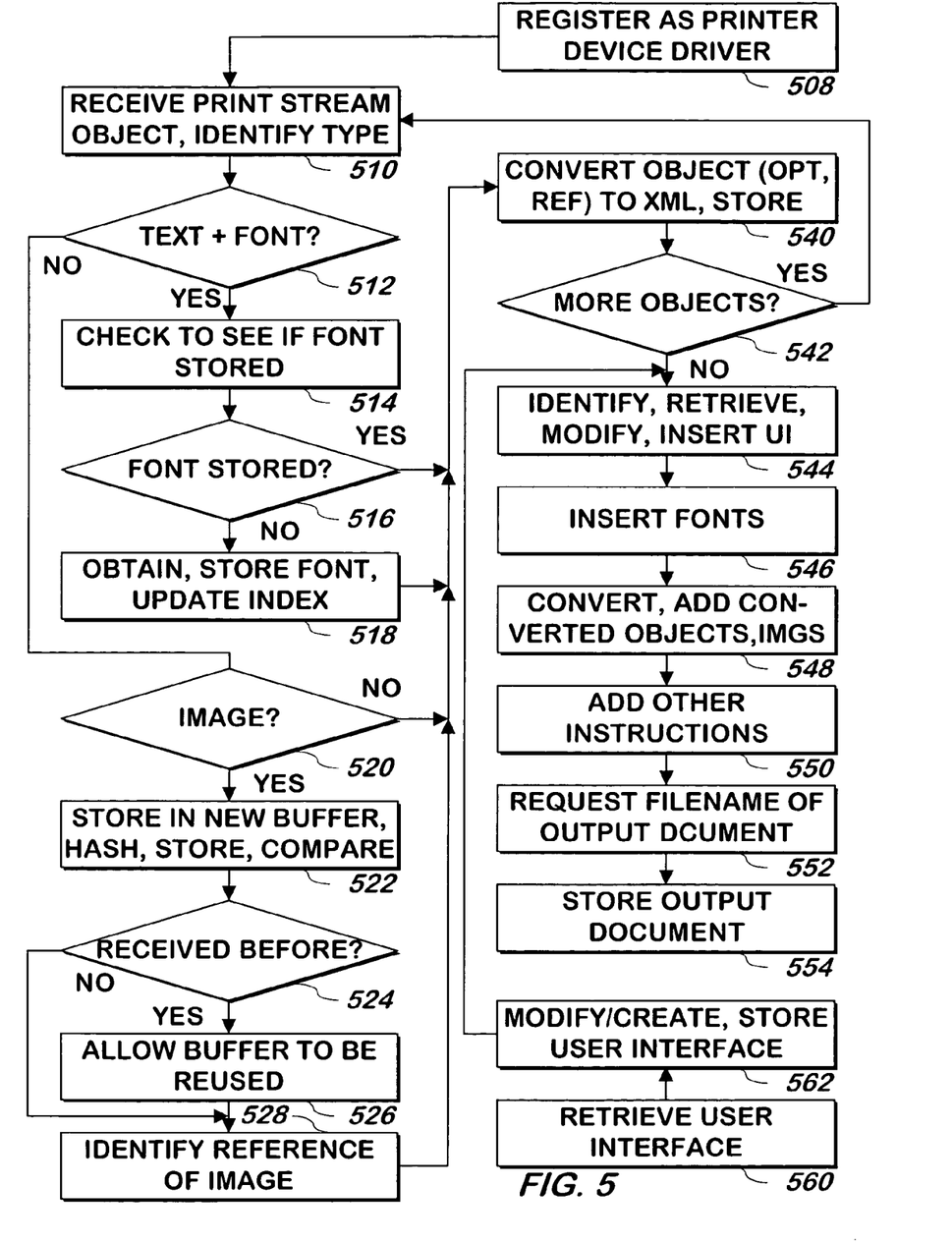
FIG. 5 is a flowchart illustrating a method of producing an output document according to one embodiment of the present invention.

Referring now to FIG. 5, a method of producing an output document is shown according to one embodiment of the present invention. Steps 510-554 are registered 508 as a printer device driver for a logical printer as described above and steps 510-554 may be performed when a user prints to the logical printer from any application program that can print using a print stream as described herein.

A print stream object is received and the type of the object is identified 510. A print stream object may include only a single component or multiple components, such as the tiles that can form an image or a group of characters and a font definition that makes up a block of text. If the object is text 512, the object will specify font, either explicitly or implicitly (e.g. if no font is included, the default font is implicitly specified), and a font buffer index is checked to identify if it contains the specified font 514. If so 516, the method continues at step 540 and otherwise 516, the font is retrieved and stored 518 in the font buffer as described above, the index is updated 518, and the method continues at step 540.

If the object is not text 512, if the object is an image 520, which may be made up of several tiled images, the image is stored in a new buffer, the image is hashed to produce a hash result, the hash result is stored associated with the image, and the hash result is compared with the hash results associated with other stored images stored in other buffers 522. If the hash results match, the image has been received before 524, and the buffer is marked for reuse, 526 and otherwise the buffer will not be reused and the method continues at step 528. If the hash results do not match, the method continues at step 528. At step 528, a reference to the image in the buffer that will be retained that matches the received image, or the buffer of the received image, is identified for use in step 540 and the method continues at step 540. If the object is not an image 520, the method continues at step 540.

At step 540, the object is converted to an XML object, consisting of one or more tags and values, and stored. The conversion can involve referencing an image (and the converted object does not contain the actual image) or font, changing one or more "exclusive-or" or "and" statements to a mask for an instance of an image, or any other conversion. Step 540 may include adding or deleting objects as part of, or in addition to, a conversion. If there are more objects in the stream 542, the method continues at step 510 and otherwise 542, a user interface is identified, optionally modified and retrieved 544 along with the fonts stored as described above 546 and the user interface and fonts are inserted into an output document file as described above.

The objects converted as described above are converted, for example, from XML to the FLASH .swf file format, and stored in the output document file 548, which may employ a default extension to allow it to be recognized for display using a browser running a plug-in as described in more detail below. If the instruction references an image for the first time, it is inserted into the output document file as part of step 548. Other instructions may be optionally added 550 after the converted objects, user interface, fonts and images or during any of steps 544-548. In one embodiment, the conversions of step 548 and added instructions of step 550 may include ensuring that each page of objects (corresponding to different pages of the stream) is converted to its own separate movie clip, that is added in an order or named in such a way to imply the order of the page of the stream to which the movie clip corresponds.

The filename of the output document is requested and received 552 and the output document file is stored 554 as described above.

At any time prior to the incorporation of the user interface into the output document in step 544, the user may alter the user interface or create a new one as described above. An existing user interface or its source file may be optionally retrieved 560 and altered and stored 562 or a new user interface may be created and stored 562. Step 562 may include generating a user interface file from the source file for that user interface file. That user interface may be used in step 544.

Figure 6:
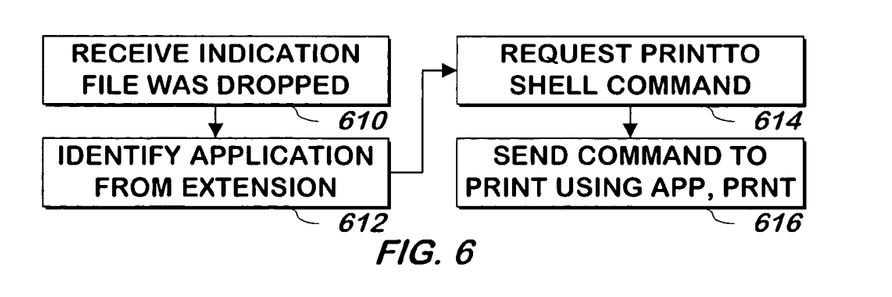
FIG. 6 is a flowchart illustrating a method of creating an output document via a drag and drop interface according to one embodiment of the present invention.

Referring now to FIG. 6, a method of creating an output document via a drag and drop interface is shown according to one embodiment of the present invention. An indication is received 610 from an operating system that a file has been dropped into a window. The application is identified from an extension to the filename 612 and a command is provided 614 to the operating system to request the format of the printto shell command as described above. A command is provided 616 to cause the operating system to instruct the application identified in step 612 to print the file using the printer specified in step 614. As part of step 616, the application will print the file, and the stream of commands will be processed as described above with reference to FIG. 5.

Figure 7:
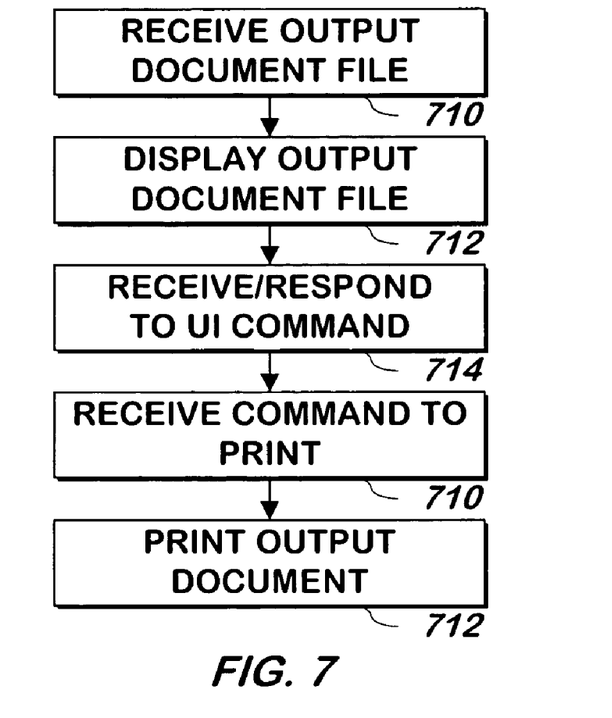
FIG. 7 is a flowchart illustrating a method of displaying and printing an output document according to one embodiment of the present invention.

Referring now to FIG. 7, a method of displaying and printing a document is shown according to one embodiment of the present invention. An output document file is received 710 and displayed 712 using a plug-in to a browser, or another application that is lightweight as described above, has other substantial uses, or both, as described above. Actions performed on user interface controls are responded to 714 according to the control to navigate the pages of the output document (so, for example, that the desired movie clip is scrolled onto the window inside the user interface as described above), control the size of the image in the window, and perform other functions. A command may be received 716 to print the output document via the user interface controls in the output document file and some or all of the pages on the file are printed 718 using a physical printer according to the command received in step 716.

Figure 8:
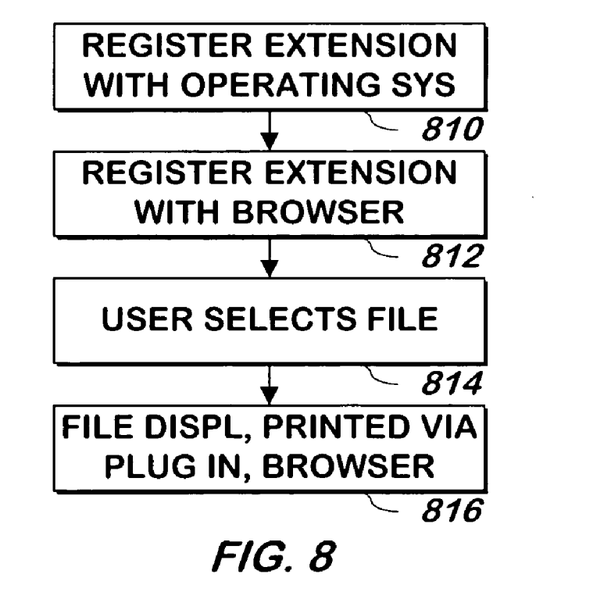
FIG. 8 is a flowchart illustrating a method of displaying and printing a file according to one embodiment of the present invention.

Referring now to FIG. 8, a method of displaying and printing a file is shown according to one embodiment of the present invention. A file extension used as the default file extension for output document files is registered 810 with an operating system to allow the operating system to run a browser when the user double clicks the file, and the file extension is also registered 812 with the browser to allow the browser to run a plug-in, such as the conventional FLASH player, that can process output document files when the browser receives such a file. When the user double clicks or otherwise selects the file 814, the plug-in, operating under control of the browser, displays and optionally prints 816 the file as described above with reference to FIG. 7.

What is claimed is:

1. A method comprising:
    displaying an icon via an operating system, the icon capable of responding to a file dragged onto it;
    responsive to the file dragged onto the icon:
        causing the operating system to cause an application corresponding to the file to print the file to a logical printer corresponding to a printer driver;
        receiving a description of the file in a page description language from the application; and
    building a document responsive to the description of the file, the document capable of being viewed in a browser window, wherein building the document comprises inserting computer instructions for a user interface into the document, the user interface comprising one or more user interface controls for a user to control a navigation of the document, wherein the computer instructions are useable to display the user interface in the browser window along with content of the document.

2. The method of claim 1 wherein the document is capable of being viewed in a browser window using a plug-in to the browser, wherein the plug-in is configured to execute the computer instructions to display the user interface.

3. The method of claim 1 wherein building the document comprises:
    building a user interface description; and
    generating the computer instructions based on the user interface description.

4. The method of claim 3 wherein building the document comprises selecting user interface controls in accordance with the description of the file.

5. The method of claim 1 wherein building the document comprises describing how the document appears on a pageby-page basis, and the document having a consistent appearance when viewed on different computer systems.

6. A computer program product, encoded on a computer-readable medium, operable to cause data processing apparatus to perform operations comprising:
    displaying an icon via an operating system, the icon capable of responding to a file dragged onto it;
    responsive to the file dragged onto the icon:
        causing the operating system to cause an application corresponding to the file to print the file to a logical printer corresponding to a printer driver;
        receiving a description of the file in a page description language from the application; and
        building a document responsive to the description of the file, the document capable of being viewed in a browser window, wherein building the document comprises inserting computer instructions for a user interface into the document, the user interface comprising one or more user interface controls for a user to control a navigation of the document, wherein the computer instructions are useable to display the user interface in the browser window along with content of the document.

7. The computer program product of claim 6 wherein the document is capable of being viewed in a browser window using a plug-in to the browser, wherein the plug-in is configured to execute the computer instructions to display the user interface.

8. The computer program product of claim 6 wherein building the document comprises:
    building a user interface description; and
    generating the computer instructions based on the user interface description.

9. The computer program product of claim 8 wherein building the document comprises selecting user interface controls in accordance with the description of the file.

10. The computer program product of claim 6 wherein building the document comprises describing how the document appears on a page-by-page basis, and the document having a consistent appearance when viewed on different computer systems.

11. A system comprising:
an output device; and
a computer programmed to perform operations comprising:
    displaying an icon on the output device via an operating system, the icon capable of responding to a file dragged onto it;
    responsive to the file dragged onto the icon:
        causing the operating system to cause an application corresponding to the file to print the file to a logical printer corresponding to a printer driver;
        receiving a description of the file in a page description language from the application; and
        building a document responsive to the description of the file, the document capable of being viewed in a browser window, wherein building the document comprises inserting computer instructions for a user interface into the document, the user interface comprising one or more user interface controls for a user to control a navigation of the document, wherein the computer instructions are useable to display the user interface in the browser window along with content of the document.

12. The system of claim 11 wherein the document is capable of being viewed in a browser window using a plug-in to the browser, wherein the plug-in is configured to execute the computer instructions to display the user interface.

13. The system of claim 11 wherein building the document comprises:
    building a user interface description; and
    generating the computer instructions based on the user interface description.

14. The system of claim 13 wherein building the document comprises selecting user interface controls in accordance with the description of the file.

15. The method of claim 11 wherein building the document comprises describing how the document appears on a page-by-page basis, and the document having a consistent appearance when viewed on different computer systems.

* * * * *

UNITED STATES PATENT AND TRADEMARK OFFICE
CERTIFICATE OF CORRECTION

PATENT NO. : 8,276,089 B1  
APPLICATION NO. : 10/886263  
DATED : September 25, 2012  
INVENTOR(S) : Narciso Jaramillo and Steven Johnson It is certified that error appears in the above-identified patent and that said Letters Patent is hereby corrected as shown below:

In Column 14, line 36 (in Claim 15) of the printed patent, delete "method" and insert --system--.

Signed and Sealed this  
First Day of January, 2013

David J. Kappos  
*Director of the United States Patent and Trademark Office*